United States Patent
Fang

(10) Patent No.: US 10,684,386 B2
(45) Date of Patent: Jun. 16, 2020

(54) METHOD AND APPARATUS OF NEAR-BIT RESISTIVITY FOR LOOKING-AHEAD

(71) Applicant: Baker Hughes, a GE company, LLC, Houston, TX (US)

(72) Inventor: Sheng Fang, Houston, TX (US)

(73) Assignee: Baker Hughes, a GE Company, LLC, Houston, TX (US)

( * ) Notice: Subject to any disclaimer, the term of this patent is extended or adjusted under 35 U.S.C. 154(b) by 64 days.

(21) Appl. No.: 15/670,837

(22) Filed: Aug. 7, 2017

(65) Prior Publication Data

US 2019/0041542 A1 Feb. 7, 2019

(51) Int. Cl.
| | |
|---|---|
| G01V 3/28 | (2006.01) |
| G01V 3/10 | (2006.01) |
| E21B 7/04 | (2006.01) |
| E21B 49/00 | (2006.01) |
| E21B 10/42 | (2006.01) |
| E21B 47/09 | (2012.01) |
| G01V 3/26 | (2006.01) |
| E21B 47/18 | (2012.01) |

(52) U.S. Cl.
CPC ............ *G01V 3/28* (2013.01); *E21B 7/04* (2013.01); *E21B 10/42* (2013.01); *E21B 47/0905* (2013.01); *E21B 49/00* (2013.01); *G01V 3/104* (2013.01); *G01V 3/26* (2013.01); *E21B 47/18* (2013.01)

(58) Field of Classification Search
CPC .......... G01V 3/28; G01V 3/104; E21B 49/00; E21B 7/04; E21B 47/18
See application file for complete search history.

(56) References Cited

U.S. PATENT DOCUMENTS

| | | |
|---|---|---|
| 5,452,761 A | 9/1995 | Beard et al. |
| 6,553,314 B2 | 4/2003 | Kriegshauser et al. |
| 6,885,947 B2 | 4/2005 | Xiao et al. |
| 7,027,922 B2 | 4/2006 | Bespalov et al. |
| 2003/0085059 A1 | 5/2003 | Kuckes et al. |
| 2009/0072825 A1 | 3/2009 | Prammer et al. |

(Continued)

FOREIGN PATENT DOCUMENTS

WO 2015195089 A1 12/2015

OTHER PUBLICATIONS

PCT/US2018/045580—International Search Report dated Nov. 15, 2018.

*Primary Examiner* — Daniel R Miller
(74) *Attorney, Agent, or Firm* — Mossman Kumar & Tyler PC

(57) ABSTRACT

Systems, methods, and devices for evaluation of an earth formation intersected by a borehole using a logging tool. Tools include sensor assemblies with permanent magnets mounted at a first radial distance from an axis of rotation of the sensor assembly, as well as receiver sensors. The sensor assembly is configured to generate an alternating current in a volume of interest of the formation surrounding the borehole with a time varying magnetic field in the volume produced by rotating the sensor assembly about the axis of rotation. Methods include making EM signal measurements or magnetic field measurements with receiver sensors responsive to the alternating current and estimating at least a formation property of the volume using the measurements.

15 Claims, 9 Drawing Sheets

(56) References Cited

U.S. PATENT DOCUMENTS

| | | |
|---|---|---|
| 2009/0126997 A1 | 5/2009 | Webb |
| 2013/0057287 A1 | 3/2013 | Le et al. |
| 2013/0080061 A1* | 3/2013 | Ruths ................. G01V 3/28 |
| | | 702/9 |
| 2016/0194951 A1* | 7/2016 | Hay .................. E21B 47/0905 |
| | | 175/24 |
| 2018/0038218 A1* | 2/2018 | Hay .................. E21B 47/022 |

* cited by examiner

N = 2

N = 1/2

N = 4

N = 1

METHOD AND APPARATUS OF NEAR-BIT RESISTIVITY FOR LOOKING-AHEAD

FIELD

The disclosure is related to the field of electromagnetic induction well logging for determining the resistivity variation of earth formations penetrated by wellbores or geosteering applications. More specifically, the disclosure addresses the structure of induction logging tools.

BACKGROUND

Electrical well logging is well known and various devices and various techniques have been described for this purpose. Properties of the formation may be estimated by creating electromagnetic (EM) excitation in the formation with at least one transmitter, and receiving related signals at one or more receiver antennas. Estimation of these properties aids in understanding the structure of the earth formation, which enables and/or facilitates exploration and development of the formation.

Historically, measurements of resistivity, or its inverse, conductivity, have been used for, among other reasons, inferring the fluid content of the earth formations and distances to bed boundaries. Also, lower conductivity (higher resistivity) measurements may be indicative of hydrocarbon-bearing earth formations.

SUMMARY

In aspects, the present disclosure is related to an apparatus for evaluating a volume of interest of an earth formation using electromagnetic (EM) signals. The apparatus may include a tool configured for conveyance in a borehole intersecting the formation, the tool having disposed thereon a sensor assembly comprising: i) at least one permanent magnet mounted at a first radial distance from an axis of rotation of the sensor assembly, and ii) at least one receiver sensor mounted at least one second radial distance from the axis, wherein the sensor assembly is configured to generate an alternating current in a volume of interest of the formation surrounding the borehole with a time varying magnetic field in the volume produced by rotating the sensor assembly about the axis of rotation. The tool may also include circuitry, which may include at least one processor, configured to make measurements at the at least one receiver sensor responsive to the alternating current; and estimate at least a formation property of the volume using the measurements. The measurements may include at least one of: i) EM signals and ii) magnetic fields.

The tool may include a drill collar having a drillbit at the distal end of the drillstring. The tool may be configured to disintegrate the formation at the bit to extend the borehole by rotating the drill collar.

The sensor assembly may include a plurality of permanent magnets, with each magnet of the plurality configured to rotate about the axis. The sensor assembly may include a plurality of receiver sensors mounted at least one radial distance from the axis of rotation of the sensor assembly, with each receiver sensor of the plurality of receiver sensors configured to be rotated about the axis. The radial distance at which the receiver sensors are mounted may be the same for each sensor or not. The radial distance at which any particular receiver sensor is mounted may be the same distance as the distance at which a magnet of the plurality of permanent magnets is mounted.

The tool may be configured to rotate the plurality of receiver sensors synchronously with the plurality of permanent magnets while generating the alternating current; and make the measurements of the formation property while rotating. The plurality of receiver sensors may comprise induction receiver coils each wound around corresponding permanent magnets of the plurality of permanent magnets. The plurality of receiver sensors may comprise induction receiver coils each wound around a corresponding high magnetic permeability core. The at least one receiver sensor may comprise at least one of: i) at least one induction coil; ii) at least one toroid coil; iii) at least one magnetometer.

Aspects of the disclosure may include methods of evaluating a volume of interest of an earth formation intersected by a borehole using electromagnetic (EM) signals, and may include use of apparatus as described above. Methods may include conveying a tool in the borehole, the tool having disposed thereon a sensor assembly comprising: i) at least one permanent magnet mounted at a first radial distance from an axis of rotation of the sensor assembly, and ii) at least one receiver sensor mounted at least one second radial distance from the axis; generating an alternating current in a volume of interest of the formation surrounding the borehole with a time varying magnetic field in the volume produced by rotating the sensor assembly about the axis of rotation; making measurements at the at least one receiver sensor responsive to the alternating current, the measurements comprising at least one of: i) EM signals, and ii) magnetic fields; and estimating at least a formation property of the volume using the measurements.

Conveying the tool may include extending the borehole by rotating a drill collar having a drillbit at the distal end of the drillstring to thereby disintegrate the formation at the bit. The sensor assembly may include a plurality of receiver sensors mounted at least one radial distance from the axis of rotation of the sensor assembly, with each receiver sensor of the plurality of receiver sensors configured to be rotated about the axis. Methods may include rotating the plurality of receiver sensors synchronously with the plurality of permanent magnets while generating the alternating current; and making the measurements of the formation property while rotating.

The plurality of receiver sensors may include induction receiver coils each wound around corresponding permanent magnets of the plurality of permanent magnets. The plurality of receiver sensors may include induction receiver coils each wound around a corresponding high magnetic permeability core. The measurements may comprise measurements of electrical signals caused by a secondary time-varying magnetic field generated by the alternating current. The at least one receiver sensor may include at least one of: i) at least one induction coil; ii) at least one toroid coil; iii) at least one magnetometer.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1:
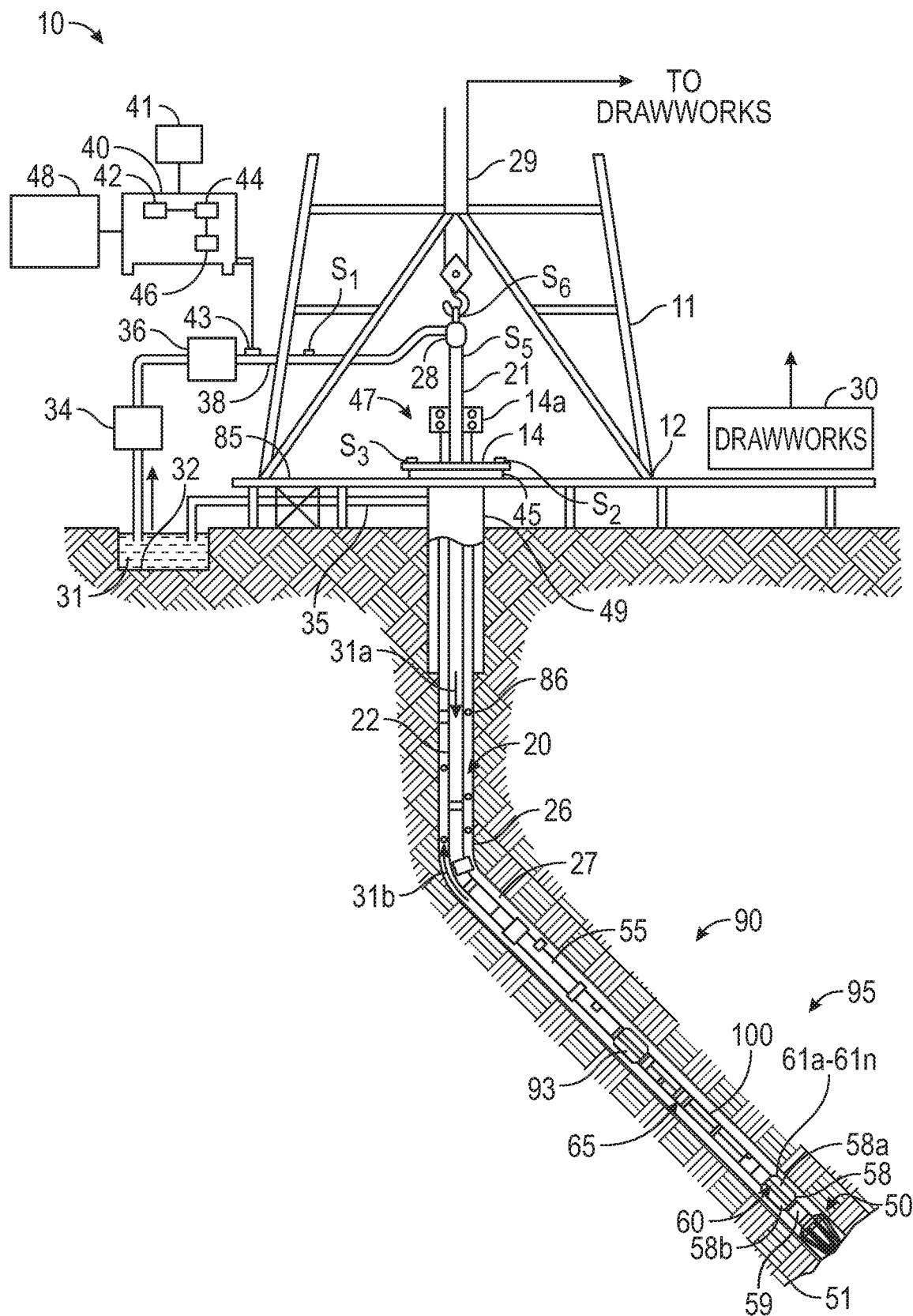
FIG. 1 shows an a system for evaluation of an earth formation using measurements from a downhole induction logging tool in accordance with embodiments of the present disclosure.

This disclosure generally relates to estimating, with coils or other sensors, alternating electric fields or magnetic fields resulting from eddy currents in a formation generated by rotating at least one magnet in a borehole intersecting a volume of interest of a formation. In various embodiments shown below, arrays of axially or radially directed magnets may be rotated about a longitudinal axis in the borehole, such as a longitudinal axis of the measurement instrument or of the tool the instrument is disposed upon.

Electromagnetic induction or propagation resistivity instruments can be used to determine the electrical conductivity of earth formations surrounding a wellbore. An electromagnetic induction well logging instrument is described, for example, in U.S. Pat. No. 5,452,761 issued to Beard et al., having the same assignee as the present disclosure and the contents of which are incorporated herein by reference. The instrument by Beard includes a transmitter coil and a plurality of receiver coils positioned at axially spaced apart locations along the instrument housing. An alternating current is passed through the transmitter coil. Voltages which are induced in the receiver coils as a result of alternating magnetic fields induced in the earth formations are then measured. The magnitude of certain phase components of the induced receiver voltages are related to the conductivity of the media surrounding the instrument. The direct field from the transmitter can impair accurate measurement.

The problem also exists in multi-component logging tools. See, for example, U.S. Pat. No. 6,553,314 to Kriegshauser et al., and U.S. Pat. No. 6,885,947 to Xiao et al., having the same assignee as the present disclosure and the contents of which are incorporated herein by reference. In such logging tools, the number of receivers is fewer than in a multi-array logging tool, but nevertheless, three components of data are typically measured.

In the present disclosure, the transmitter of the conventional tool (e.g., as indicated in Beard, etc.) featuring a transmitter coil fed a periodic signal (e.g., a sin wave or square wave) may be replaced with a rotating magnet array configured to induce an alternating current in a volume of interest via the time-varying magnetic field accompanying the rotating magnets.

Looking ahead of the bit is desirable for geosteering. Conventional induction-based resistivity tools can measure signals from the surrounding formation (e.g., predominantly side looking). In limited circumstances (e.g., in a highly deviated well), these tools can be used to indirectly measure properties somewhat ahead of the bit (e.g., through side-looking) but are limited by the distance between the tool and the drill bit. By shifting some sensors closer to the drill bit, it is possible to derive some properties ahead of the drill bit after accurately eliminating those signals from behind and side with more measurements. However, this can increase uncertainty from geological noises from the formation (e.g., behind and/or to the side). More recently developed tools, such as bit resistivity tools, avoid some of these limitations, but can only make shallow measurements, and are often affected by mud, particularly oil-based mud. Thus, looking ahead of the bit using instruments in existing tools can be problematic.

Aspects of the present disclosure include sensors featuring permanent magnets functioning to generate a signal from the movement thereof with respect to the formation. Multi-coils or toroid coils with a high permeable core may be used as a receiver. Such a sensor can be installed near or on a drill bit, enabling measurements reflective of properties much farther ahead of the bit than is currently possible.

Beneficially, these magnetic "transmitters" do not require electrical power. In the drilling context, a drilling collar at the end of a drill string may be rotated, either from the surface or from another mechanism supplying rotary power. By disposing the instrument on one of these components, rotation of the magnet array results in a signal. Further, particular embodiments disclosed herein are devoid of earth field effects. Also, no direct alternating-current field interfering with the measurement is generated by the source.

Aspects of the present disclosure relate to apparatus and methods for electromagnetic well logging including evaluating a volume of interest of an earth formation intersected by a borehole using electromagnetic (EM) signals. Methods may include conveying a tool in the borehole. Conveying the tool may be carried out by extending the borehole by rotating a drill collar having a drillbit at the distal end of the drillstring to thereby disintegrate the formation at the bit. The tool may have disposed thereon a sensor assembly comprising: i) at least one permanent magnet mounted at a first radial distance from an axis of rotation of the sensor assembly, and ii) at least one receiver sensor mounted at least one second radial distance from the axis.

Methods may include generating an alternating current in a volume of interest of the formation surrounding the borehole with a time varying magnetic field in the volume produced by rotating the magnet assembly about the axis of rotation. That is, each bar magnet of the magnet assembly may be deployed in a radial (r) or axial (z) orientation, for example, at a particular distance from an axis of rotation of the assembly. The assembly is rotated such that each sensor and magnet revolves around the axis of rotation. The distances and orientations may all be the same, or may vary. In one example, magnet assembly may include magnets separated into groups, with the magnets of each group having a different distance (radius) and orientation. Methods may include making measurements at the at least one receiver sensor responsive to the alternating current. The measurements may comprise at least one of: i) EM signals, and ii) magnetic fields. Methods may include estimating at least a formation property of the volume using the measurements.

The present disclosure relates to estimating and displaying parameters of interest, e.g., properties of the formation relating to electromagnetic (EM) measurements. The formation may be intersected by a wellbore and the measurements may be taken in the wellbore. The EM measurements may be used to estimate the parameter of interest. Aspects of the present disclosure facilitate the display and analysis of EM measurements. Further aspects may include methods for conducting a drilling operation by estimating the parameter of interest (e.g., resistivity or a boundary of resistivity contrast). Estimating the parameter of interest may be carried out in real-time during the drilling operation, and conducting the drilling operation may be carried out in dependence upon the estimate.

The present disclosure is susceptible to embodiments of different forms. There are shown in the drawings, and herein will be described in detail, specific embodiments of the present disclosure with the understanding that the present disclosure is to be considered an exemplification of the principles of the disclosure, and is not intended to limit the disclosure to that illustrated and described herein. Indeed, as will become apparent, the teachings of the present disclosure can be utilized for a variety of well tools and in all phases of well construction and production. Accordingly, the embodiments discussed below are merely illustrative of the applications of the present disclosure.

Downhole electromagnetic measurement tools are well known in the art. Inductive sensors are used in downhole tools, particularly in logging-while-drilling ('LWD') and measurement-while-drilling ('MWD') contexts. The basic topology often consists of one or more transmitters associated with one or more respective receivers.

Aspects of the present disclosure may include various components for performing an electromagnetic excitation including exciting alternating currents or other electrical phenomena in a formation surrounding a borehole, such as an array of permanent magnets with the array configured to be rotated, as well as for sensing electrical effects of the generated phenomena, such as, for example, a plurality of coils. A magnetic component (e.g., a permanent magnet array), which functions in place of a traditional transmitter, may generate an oscillating signal in an adjacent geological formation via rotation of the magnetic component. The signal may be a single-frequency signal, or may vary in frequency, and may approximate a sinusoidal signal. One application for downhole measurements is formation evaluation, where the goal is to evaluate the oil content of a possible reservoir.

FIG. 1 shows an a system for evaluation of an earth formation using measurements from a downhole induction logging tool in accordance with embodiments of the present disclosure. The system 10 includes a drill string 20 that is shown disposed in a wellbore or borehole 26 that penetrates at least one earth formation 95. The system 10 also includes a tool 100 configured for taking electromagnetic measurements in the borehole in order to generate measurement information.

As described herein, "borehole" or "wellbore" refers to a single hole that makes up all or part of a drilled well. Depending on the configuration, the system 10 may be used during drilling and/or after the wellbore 12 has been formed. While a land system is shown, the teachings of the present disclosure may also be utilized in offshore or subsea applications. As described herein, "formations" refer to the various features and materials that may be encountered in a subsurface environment and surround the borehole. The term "information" includes, but is not limited to, raw data, processed data, and signals.

FIG. 1 shows a drill string 20 including a bottomhole assembly (BHA) 90 conveyed in the borehole 26 as the carrier. The drilling system 10 includes a conventional derrick 11 erected on a platform or floor 12 which supports a rotary table 14 that is rotated by a prime mover, such as an electric motor (not shown), at a desired rotational speed. A tubing (such as jointed drill pipe 22), having the drilling assembly 90 attached at its bottom end, extends from the surface to the bottom 51 of the borehole 26. A drill bit 50, attached to drilling assembly 90, disintegrates the geological formations when it is rotated to drill the borehole 26. The drill string 20 is coupled to a drawworks 30 via a Kelly joint 21, swivel 28 and line 29 through a pulley. Drawworks 30 is operated to control the weight on bit ("WOB"). The drill string 20 may be rotated by a top drive (not shown) instead of by the prime mover and the rotary table 14. Alternatively, a coiled-tubing may be used as the tubing 22. A tubing injector 14a may be used to convey the coiled-tubing having the drilling assembly attached to its bottom end. The operations of the drawworks 30 and the tubing injector 14a are known in the art and are thus not described in detail herein.

It should be understood that embodiments of the present disclosure are well suited for use in wells having various configurations including horizontal wells, deviated wells, slanted wells, multilateral wells and so on. Accordingly, use of directional terms herein (e.g., above, below, upper, lower, upward, downward, topmost, lowermost, uphole, downhole, etc) refer to the direction of travel along the borehole either toward or away from the surface, with the upward direction being toward the surface and the downward direction being away from the surface.

A suitable drilling fluid 31 (also referred to as the "mud") from a source 32 thereof, such as a mud pit, is circulated under pressure through the drill string 20 by a mud pump 34. The drilling fluid 31 passes from the mud pump 34 into the drill string 20 via a desurger 36 and the fluid line 38. The drilling fluid 31a from the drilling tubular discharges at the borehole bottom 51 through openings in the drill bit 50. The returning drilling fluid 31b circulates uphole through the annular space 27 between the drill string 20 and the borehole 26 and returns to the mud pit 32 via a return line 35 and drill cutting screen 85 that removes the drill cuttings 86 from the returning drilling fluid 31b. A sensor S1 in line 38 provides information about the fluid flow rate. A surface torque sensor S2 and a sensor S3 associated with the drill string 20 respectively provide information about the torque and the rotational speed of the drill string 20. Tubing injection speed is determined from the sensor S5, while the sensor S6 provides the hook load of the drill string 20.

Well control system 47 is placed at the top end of the borehole 26. The well control system 47 includes a surface blow-out-preventer (BOP) stack 15 and a surface choke 49 in communication with a wellbore annulus 27. The surface choke 49 can control the flow of fluid out of the borehole 26 to provide a back pressure as needed to control the well.

In some applications, the drill bit 50 is rotated by only rotating the drill pipe 22. However, in many other applications, a downhole motor 55 (mud motor) disposed in the BHA 90 also rotates the drill bit 50. The rate of penetration (ROP) for a given BHA largely depends on the WOB or the thrust force on the drill bit 50 and its rotational speed.

A surface control unit or controller 40 receives signals from the downhole sensors and devices via a sensor 43 placed in the fluid line 38 and signals from sensors S1-S6 and other sensors used in the system 10 and processes such signals according to programmed instructions provided to the surface control unit 40. The surface control unit 40 displays desired drilling parameters and other information on a display/monitor 41 that is utilized by an operator to control the drilling operations. The surface control unit 40 may be a computer-based unit that may include a processor 42 (such as a microprocessor), a storage device 44, such as a solid-state memory, tape or hard disc, and one or more computer programs 46 in the storage device 44 that are accessible to the processor 42 for executing instructions contained in such programs. The surface control unit 40 may further communicate with a remote control unit 48. The surface control unit 40 may process data relating to the drilling operations, data from the sensors and devices on the surface, and data received from downhole; and may control one or more operations of the downhole and surface devices. The data may be transmitted in analog or digital form.

The BHA 90 may include a tool 100 configured for performing electromagnetic (EM) measurements. The BHA 90 may also contain other formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the formation 95 surrounding the BHA 50. For convenience, all such sensors are generally denoted herein by numeral 65. The BHA 90 may further include a variety of other sensors and devices 59 for determining one or more properties of the BHA 90, such as vibration, bending moment, acceleration, oscillations, whirl, stick-slip, weight-on-bit, fluid flow rate, pressure, temperature, rate of penetration, azimuth, tool face, drill bit rotation, etc.

The BHA 90 may include a steering apparatus or tool 58 for steering the drill bit 50 along a desired drilling path. In one aspect, the steering apparatus may include a steering unit 60, having a number of force application members 61a-61n. The force application members may be mounted directly on the drill string, or they may be at least partially integrated into the drilling motor. In another aspect, the force application members may be mounted on a sleeve, which is rotatable about the center axis of the drill string. The force application members may be activated using electro-mechanical, electro-hydraulic or mud-hydraulic actuators. In yet another embodiment the steering apparatus may include a steering unit 58 having a bent sub and a first steering device 58a to orient the bent sub in the wellbore and the second steering device 58b to maintain the bent sub along a selected drilling direction. The steering unit 58, 60 may include near-bit inclinometers and magnetometers.

The drilling system 10 may include sensors, circuitry and processing software and algorithms for providing information about desired drilling parameters relating to the BHA, drill string, the drill bit and downhole equipment such as a drilling motor, steering unit, thrusters, etc. Many current drilling systems, especially for drilling highly deviated and horizontal wellbores, utilize coiled-tubing for conveying the drilling assembly downhole. In such applications a thruster may be deployed in the drill string 20 to provide the required force on the drill bit.

Exemplary sensors for determining drilling parameters include, but are not limited to drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, strain, stress, bending moment, bit bounce, axial thrust, friction, backward rotation, BHA buckling, and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT, a downhole measurement system, manufactured by BAKER HUGHES INCORPORATED.

The drilling system 10 can include one or more downhole processors at a suitable location such as 93 on the BHA 90. The processor(s) can be a microprocessor that uses a computer program implemented on a suitable non-transitory computer-readable medium that enables the processor to perform the control of system 10 and processing of information, such as information from the sensors. The non-transitory computer-readable medium may include one or more ROMs, EPROMs, EAROMs, EEPROMs, flash memories, RAMs, hard drives and/or optical disks. Other equipment such as power and data buses, power supplies, and the like will be apparent to one skilled in the art. In one embodiment, the MWD system utilizes mud pulse telemetry to communicate data from a downhole location to the surface while drilling operations take place. The surface processor 42 can process the surface measured data, along with the data transmitted from the downhole processor, to evaluate the formation.

A point of novelty of the system illustrated in FIG. 1 is that the surface processor 42 and/or the downhole processor 93 are configured to perform certain methods (discussed below) that are not in the prior art. Surface processor 42 or downhole processor 93 may be configured to control steering apparatus 58, mud pump 34, drawworks 30, rotary table 14, downhole motor 55, other components of the BHA 90, or other components of the drilling system 10. Surface processor 42 or downhole processor 93 may be configured to control sensors described above and to generate measurement information, including estimating a parameter of interest according to methods described herein. Aspects of the disclosure include using at least one processor to perform at least one of: i) storing the measurement information in a computer memory; ii) transmitting the measurement information uphole; iii) processing the measurement information in the borehole; or iv) displaying the measurement information to an operating engineer.

Control of these components may be carried out using one or more models using methods described below. For example, surface processor 42 or downhole processor 93 may be configured to modify drilling operations i) autonomously upon triggering conditions, ii) in response to operator commands, or iii) combinations of these. Such modifications may include changing drilling parameters, steering the drillbit (e.g., geosteering), and so on. Control of these devices, and of the various processes of the drilling system generally, may be carried out in a completely automated fashion or through interaction with personnel via notifications, graphical representations, user interfaces and the like. Reference information accessible to the processor may also be used. In some general embodiments, surface processor 42, downhole processor 93, or other processors (e.g. remote processors) may be configured to operate the EM tool 100 to excite and measure EM signals.

The system 10 may include any number of downhole tools for various processes including formation drilling, geosteering, and formation evaluation (FE) for measuring versus depth and/or time one or more physical quantities in or around a borehole. The tool 100 may be included in or embodied as a BHA, drillstring component or other suitable carrier.

While a drill string 20 is shown as a conveyance device for tool 100, it should be understood that embodiments of the present disclosure may be used in connection with tools conveyed via rigid (e.g. jointed tubular or coiled tubing) as well as non-rigid (e.g. wireline, slickline, e-line, etc.) conveyance systems. The drilling system 10 may include a bottomhole assembly and/or sensors and equipment for implementation of embodiments of the present disclosure on either a drill string or a wireline. "Carrier" as described herein means any device, device component, combination of devices, media and/or member that may be used to convey, house, support or otherwise facilitate the use of another device, device component, combination of devices, media and/or member. Exemplary non-limiting carriers include drill strings of the coiled tubing type, of the jointed pipe type and any combination or portion thereof. Other carriers include, but are not limited to, casing pipes, wirelines, wireline sondes, slickline sondes, drop shots, downhole subs, bottom-hole assemblies, and drill strings.

Mathematical models, look-up tables, or other models representing relationships between the signals and the values of the formation properties may be used to characterize operations in the formation or the formation itself, optimize one or more operational parameters of a production or development, and so on. The system may carry out these actions through notifications, advice, and/or intelligent control.

Various types of electrical sensors may be used in evaluating the formation in accordance with embodiments disclosed herein. As one example, devices are described herein that are based on inducing currents in the formation though motion of a permanent magnet assembly. These novel logging instruments may be used for many applications where ahead-of-the-bit measurements are studied to infer the properties of the formation. Although aspects of the disclosure may be particularly useful in addressing challenges associated with geosteering, particular embodiments may employ the techniques disclosed herein in connection with many types of induction logging. For example, techniques of the present disclosure may be applied to multi-component induction logging, high definition induction logging, and so on.

Figure 2B:
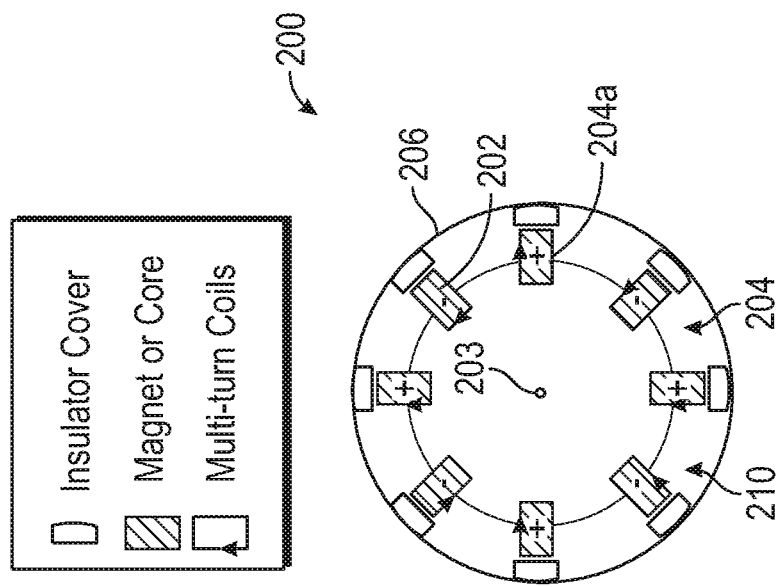
FIGS. 2A & 2B show a lateral and an axial view, respectively, of a bottom hole assembly (BHA) in accordance with embodiments of the present disclosure.
Figure 2A:
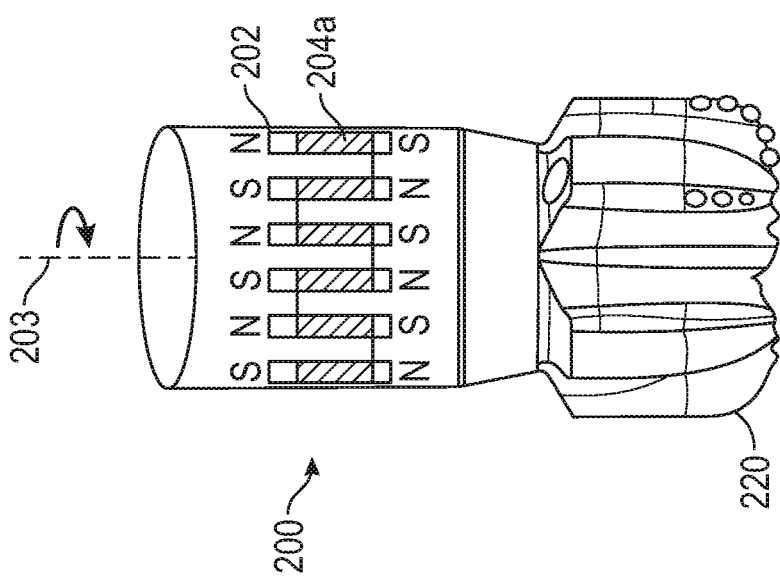
Figure 3A:
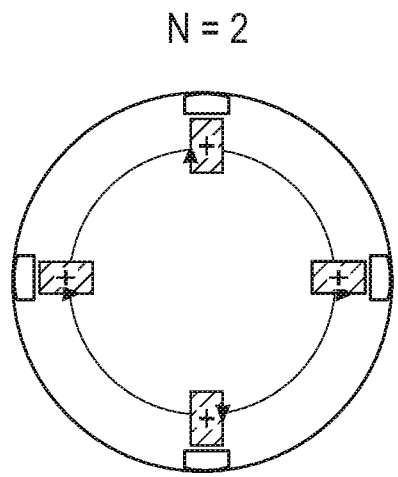
FIGS. 3A-3D illustrate various values of the magnet spatial distribution variable, which may be derived as half of the number of equally spaced magnets.
Figure 3B:
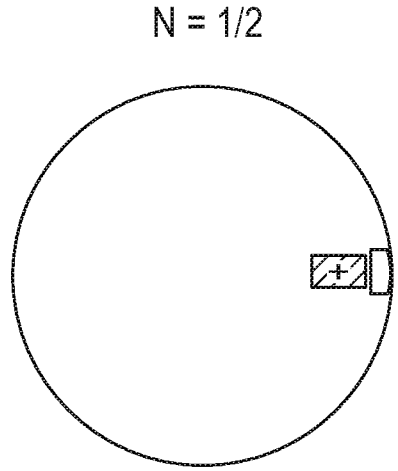
Figure 3C:
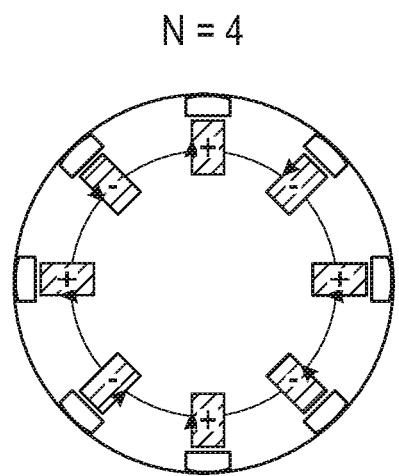
Figure 3D:
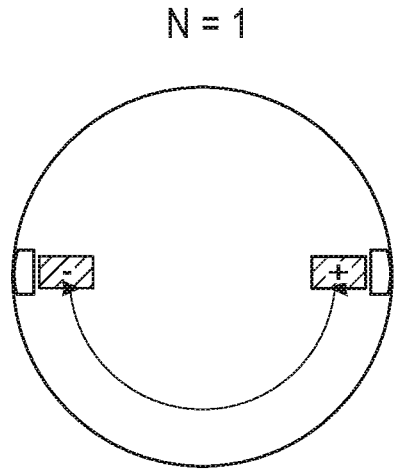

FIGS. 2A & 2B show a lateral and an axial view, respectively, of a bottom hole assembly (BHA) in accordance with embodiments of the present disclosure. The BHA 200 includes a drill bit 220 and a sensor assembly 210. The sensor assembly 210 comprises a magnet assembly 201 including at least one permanent magnet mounted at a first radial distance from an axis of rotation of the sensor assembly, and at least one receiver sensor mounted at least one other radial distance from the axis. In FIGS. 2A & 2B, the first radial distance and the at least one other radial distance are the same distance. The sensor assembly 210 includes plurality of equally spaced permanent bar magnets 202 and a plurality of connected receiver sensors (receiver loops) 204a. Receiver sensors may be read individually or operatively connected in series as part of receiver 204. The permanent bar magnets 202 are circumferentially distributed about the BHA.

In FIGS. 2A & 2B, the magnets 202 show an axial (z-directed) pole alignment with alternating polarity. However, in various embodiments, magnets 202 may be oriented in any direction, such as axially (up/down), radially (inner/outer), or angled. The magnets are non-coaxial in the z direction, so that rotation of the array produces an alternating current. Magnets may be located and oriented according to various patterns as will occur to those of skill in the art. Magnets 202 are symmetrically arranged, with each magnet diametrically opposed from one other magnet to form a diametric pair. The diametric pair arrangement creates a symmetry which results in cancelation of unwanted signals.

As described above, the sensor assembly 210 includes one or more receivers 204 configured to measure magnetic or electric fields, which may be implemented as receiver coils, toroids, electrodes, gradient magnetometers, and the like. Receiver 204 comprises a multi-turn coil 204a wound on each magnet with an alternating winding direction. The magnets and receivers together form a sensor assembly 210. The receivers may alternatively be arranged axially above or below the source location. The receiver 204 may be configured to convert an electromagnetic signal received on the sensor coil responsive to the phenomena into an output signal. That is, the receiver may be configured to make measurements at the at least one receiver sensor responsive to the alternating current. For example, the receiver may be configured to make measurements of at least one of: i) EM signals, and ii) magnetic fields.

The signal on receiver 204 may be measured in the time domain, similarly to conventional high definition induction logging systems. The signal frequency (f) may correspond to the rotational frequency of the BHA. For example, the frequency may be estimated using revolutions per minute (RPM) and a magnet spatial distribution variable N, as $$f=N*RPM/60.$$

FIGS. 3A-3D illustrate various values of the magnet spatial distribution variable, which may be derived as half of the number of equally spaced magnets. In particular applications, it may be preferable to maximize N and to position the receivers axially below or on the magnets. After positioning, each assembly may be sealed using an insulator cover 206 made of PEEK or other material.

In operation, BHA 200 is configured for rotation about an axis 203 to generate an alternating current in the formation at least one frequency. In this case, the axis 203 is the longitudinal tool axis of the BHA. Due to the structure of FIGS. 2A & 2B, this rotation involves rotating the plurality of receiver sensors synchronously with the plurality of permanent magnets while generating the alternating current, and making the measurements of the formation property while rotating. Signals occur in the sensor coil of the receiver responsive to the current. The signal contains information about formation characteristics. Thus, the receiver produces a response indicative of formation characteristics, such as the parameter of interest. A processor is configured to measure signals.

Figure 4B:
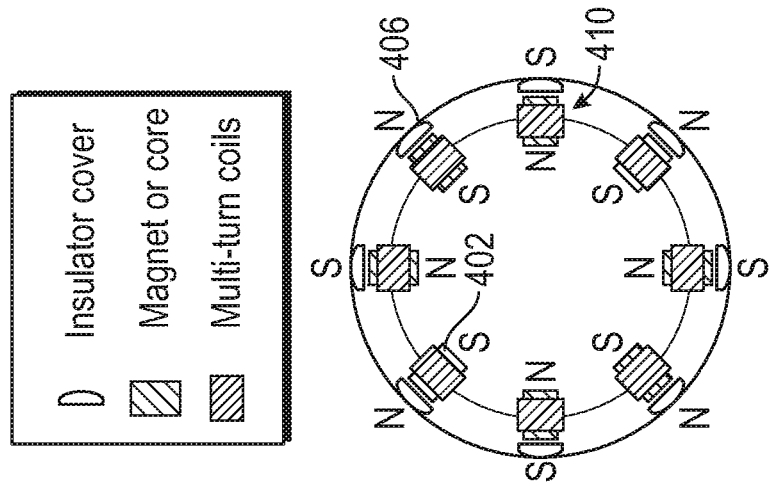
FIGS. 4A & 4B show a lateral and an axial view, respectively, of another bottom hole assembly (BHA) in accordance with embodiments of the present disclosure.
Figure 4A:
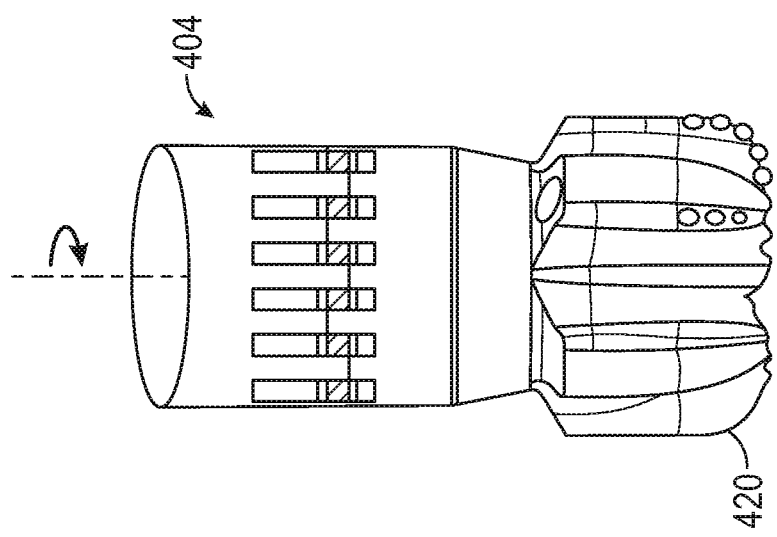

FIGS. 4A & 4B show a lateral and an axial view, respectively, of another bottom hole assembly (BHA) 400 in accordance with embodiments of the present disclosure. The BHA 400 includes a drill bit 420 and a plurality of equally spaced permanent bar magnets 402 circumferentially distributed about the BHA. Magnets 402 show a radial (r-directed) pole alignment with alternating polarity. Magnets 402 are also arranged in diametric pairs. Receiver 404 comprises multi-turn coil windings on each magnet, forming a sensor assembly 410. Alternatively, the coil windings may be wound around high magnetic permeability cores. In particular applications, it may be preferable to maximize N and to position the receivers on the magnets.

Figure 5:
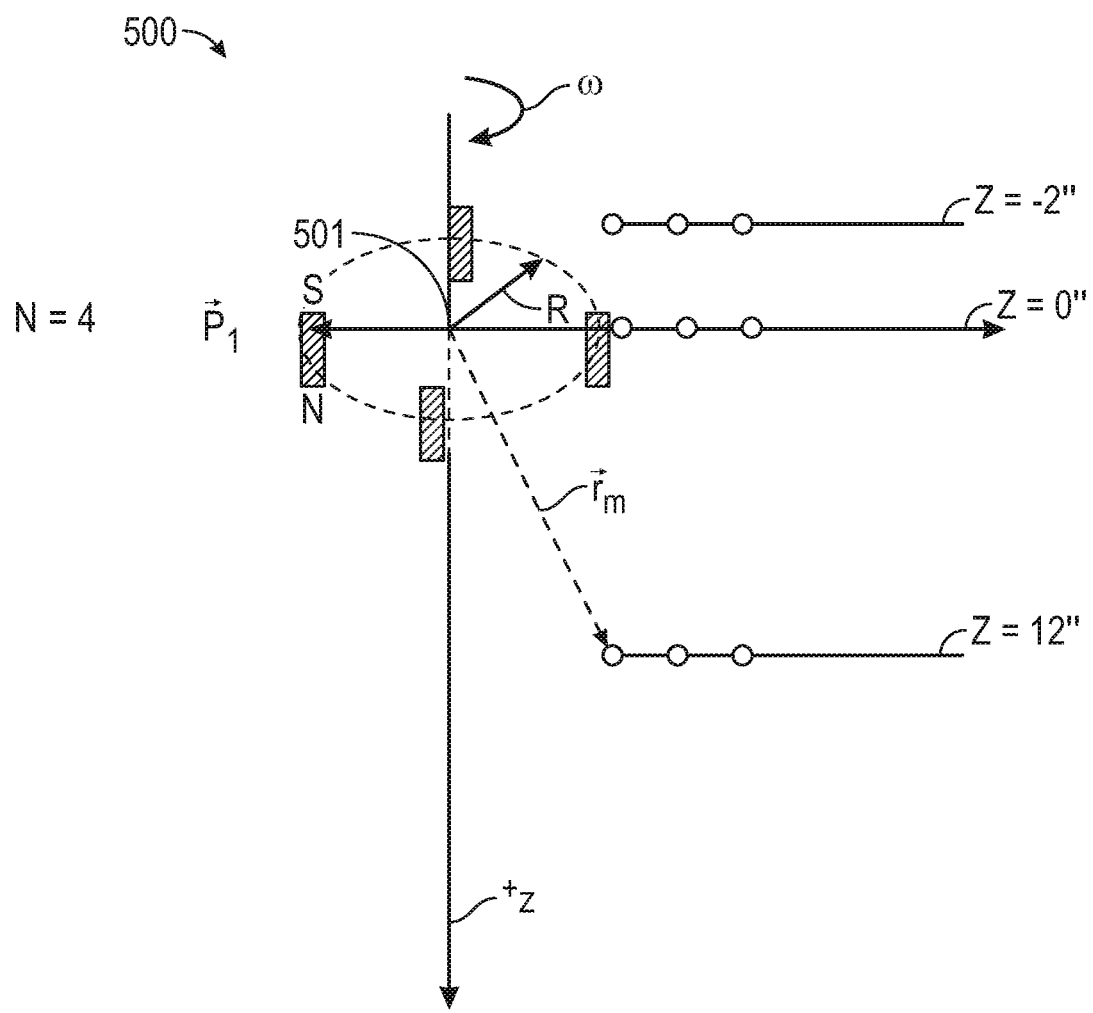
FIG. 5 shows a model illustrating alternating magnetic fields generated by the rotating magnet assembly in accordance with embodiments of the present disclosure.

FIG. 1 shows an a system for evaluation of an earth formation using measurements from a downhole induction logging tool in accordance with embodiments of the present disclosure. FIGS. 2A & 2B show a lateral and an axial view, respectively, of a bottom hole assembly (BHA) in accordance with embodiments of the present disclosure. FIGS. 3A-3D illustrate various values of the magnet spatial distribution variable, which may be derived as half of the number of equally spaced magnets. FIGS. 4A & 4B show a lateral and an axial view, respectively, of another bottom hole assembly (BHA) 400 in accordance with embodiments of the present disclosure. FIG. 5 shows a model illustrating alternating magnetic fields generated by the rotating magnet assembly in accordance with embodiments of the present disclosure. Model 500 shows a magnetic field (H) within the formation surrounding the borehole. Magnetic field H changes over time. The time-varying magnetic field H creates eddy currents in the surrounding formation, which generate secondary magnetic fields detectable at the receiver.

Model 500 uses an eight magnet configuration, with N=4, and defines the positive z direction as downhole. The electric field at a given point $r_m$ may be expressed using components $e_x$, $e_y$, an $e_z$. Magnetic moment $P_i$ is equal to $e_z$. The magnet assembly is rotated at an angular frequency of $\omega$. Magnets are at a radius R from the axis of rotation. The position vector is used to describe the field at a point on a circle over time, $r_s$, based on each magnet and may be expressed as below. The resulting relative position r may then be determined as below, leading to an expression of H.

$$\vec{P}_i = \vec{e}_z$$
$$\vec{r}_s = R\cos(\omega t)\vec{e}_x + R\sin(\omega t)\vec{e}_y$$
$$\vec{r}_m = x\vec{e}_x + y\vec{e}_y + z\vec{e}_z$$
$$\vec{r} = \vec{r}_m - \vec{r}_s$$
$$\vec{H} = \sum_i \frac{1}{4\pi}\left(\frac{3(\vec{P}_i \cdot \vec{r})\vec{r}}{r^5} - \frac{\vec{P}_i}{r^3}\right).$$

Figure 6A:
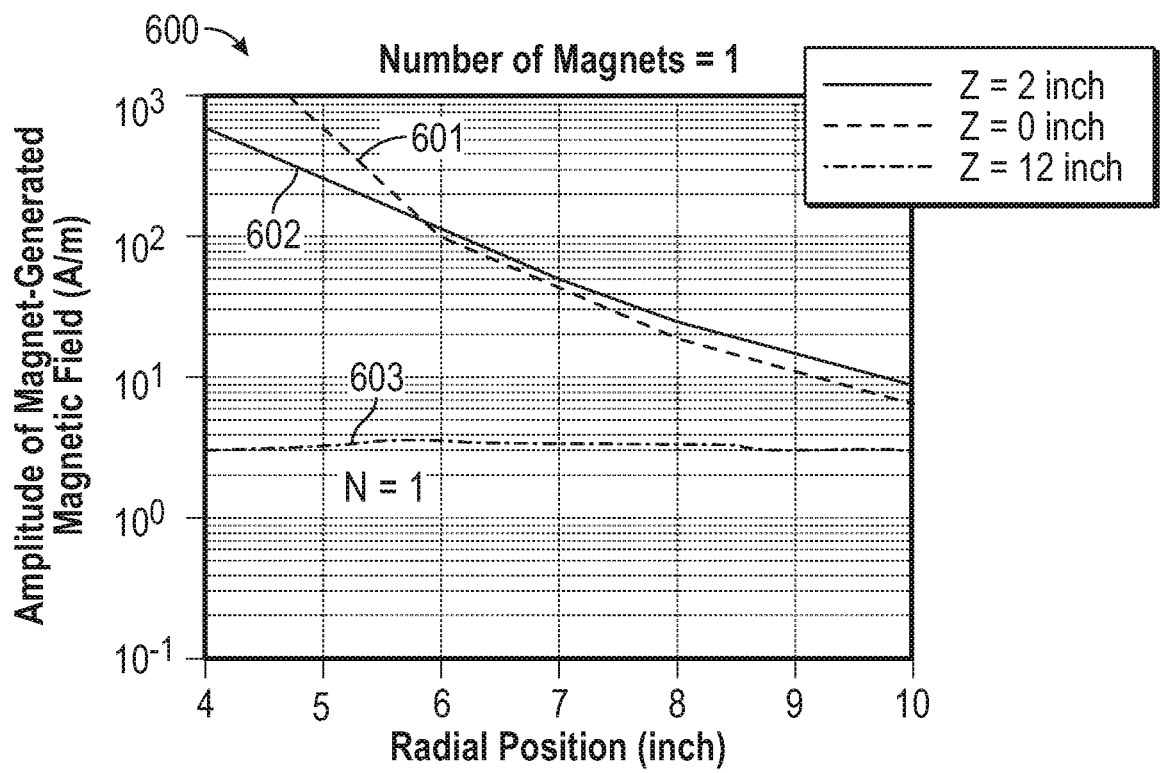
FIGS. 6A-6D show curves illustrating simulated results of effects of N on magnetic field strength with respect to radial position.

FIGS. 6A-6D show curves illustrating simulated results of effects of N on magnetic field strength with respect to radial position. FIG. 6A shows a depiction 600 illustrating curves 601, 602, 603 depicting values of amplitude of the magnet-generated magnetic field (Amps per meter) with respect to radius (in inches) at different z locations for N=1. Since z is defined with positive directed downhole, a first curve 601 is even with the plane of symmetry of the rotating magnets (z=0). A second curve 602 is two inches above the plane of symmetry (z=-2). A third curve 603 is 12 inches below the plane of symmetry (z=12).

Figure 6B:
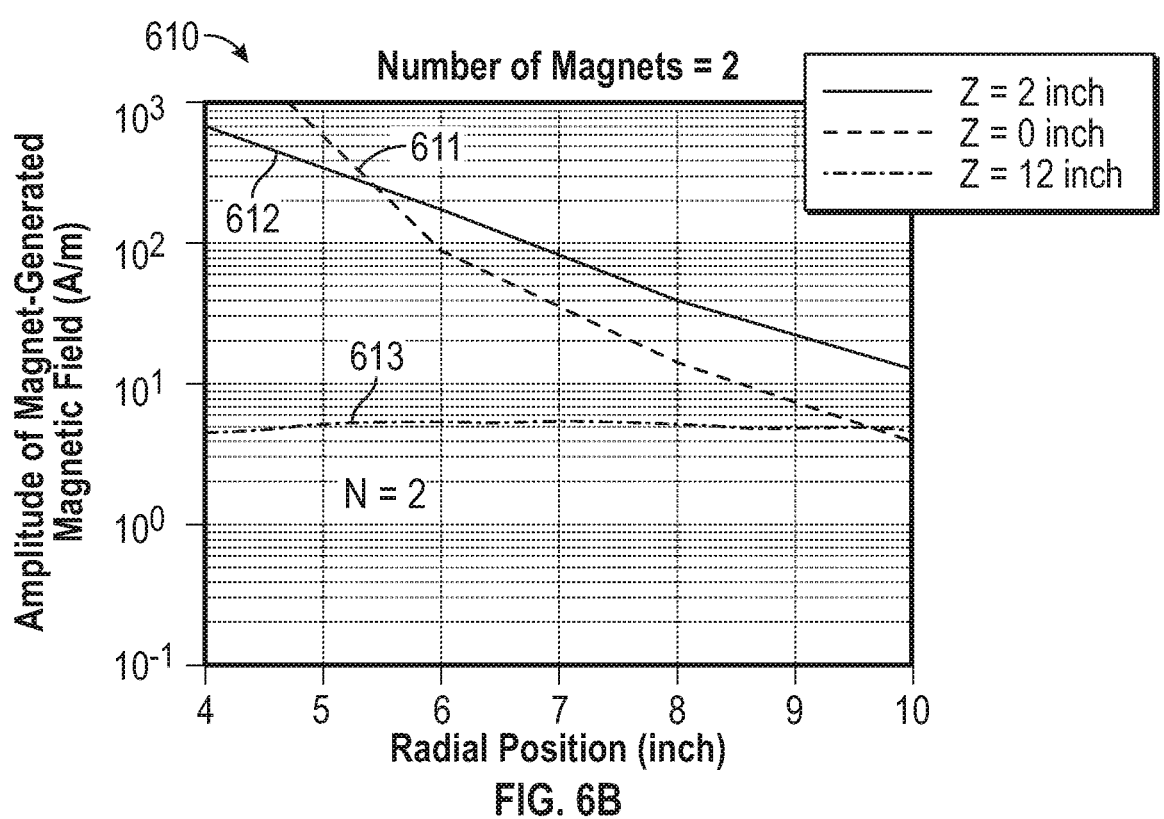

FIG. 6B shows a depiction 610 illustrating curves 611, 612, 613 depicting values of amplitude of the magnet-generated magnetic field (Amps per meter) with respect to radius (in inches) at different z locations for N=2. A first curve 611 is even with the plane of symmetry of the rotating magnets (z=0). A second curve 612 is two inches above the plane of symmetry (z=-2). A third curve 613 is 12 inches below the plane of symmetry (z=12).

Figure 6C:
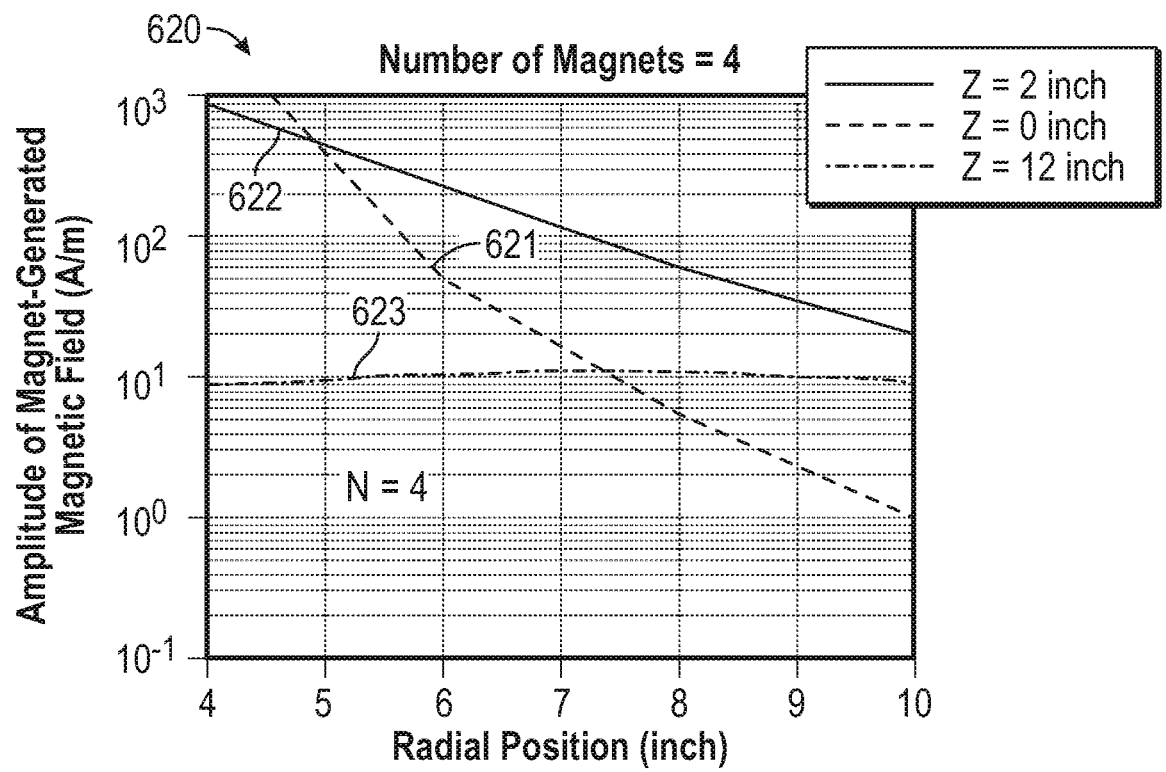

FIG. 6C shows a depiction 620 illustrating curves 621, 622, 623 depicting values of amplitude of the magnet-generated magnetic field (Amps per meter) with respect to radius (in inches) at different z locations for N=4. A first curve 621 is even with the plane of symmetry of the rotating magnets (z=0). A second curve 622 is two inches above the plane of symmetry (z=-2). A third curve 623 is 12 inches below the plane of symmetry (z=12).

Figure 6D:
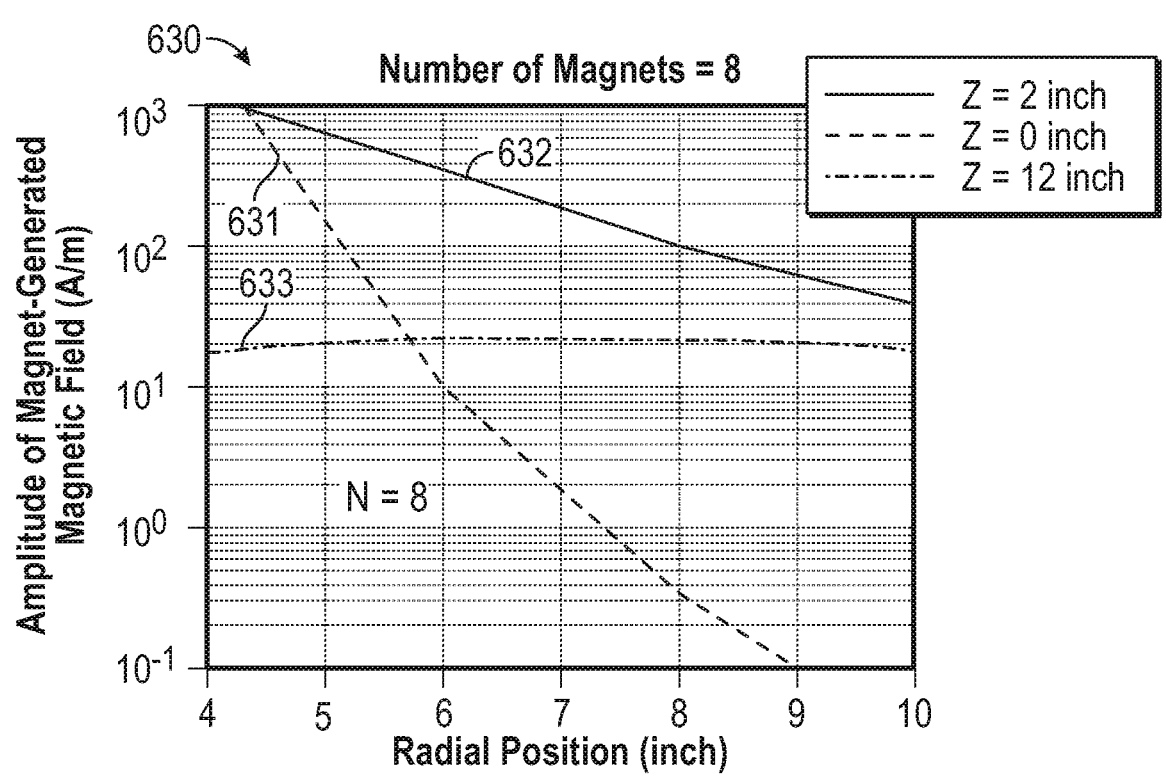

FIG. 6D shows a depiction 630 illustrating curves 631, 632, 633 depicting values of amplitude of the magnet-generated magnetic field (Amps per meter) with respect to radius (in inches) at different z locations for N=8. A first curve 631 is even with the plane of symmetry of the rotating magnets (z=0). A second curve 632 is two inches above the plane of symmetry (z=-2). A third curve 633 is 12 inches below the plane of symmetry (z=12).

As is apparent from the simulation, with increased N values the signal is increased (greater excitation). Additionally, the frequency is increased and the signal from the side is decreased.

Figure 7:
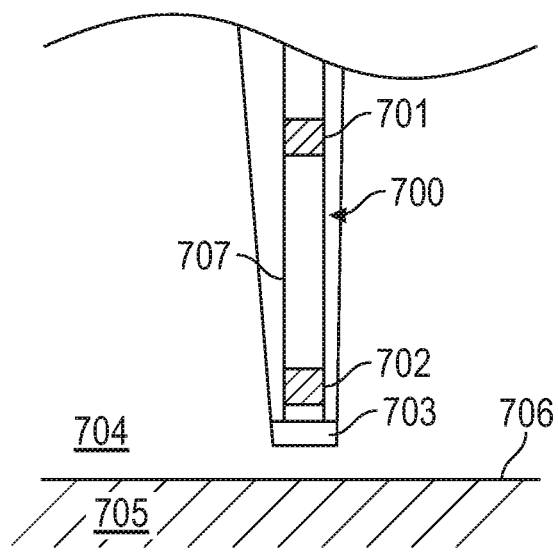
FIG. 7 illustrates a logging tool in a subterranean environment in accordance with embodiments of the present disclosure.

FIG. 7 illustrates a logging tool 700 in a subterranean environment in accordance with embodiments of the present disclosure. The tool may lie in a first volume 704 of the formation with a first resistivity value. The tool 700 may include a first instrument 701 disposed along drillstring 707 remote from the drillbit 703 and a second instrument 702 near the drillbit 703. The drillstring 707 may rotate the drillbit 703 and thereby disintegrate the formation ahead of the bit. The drillstring 707 may also rotate the first and second instruments. The second instrument 702 may be capable of ahead-of-the-bit measurement. For example, using forward modeling, the second instrument may be able to detect a resistivity contrast occurring when approaching a boundary 706 between the first volume 704 and a second volume 705 having a different resistivity than the first volume. Other embodiments may include any number of additional instruments in accordance with the present disclosure, as well as conventional transmitter or receiver assemblies.

Figure 8:
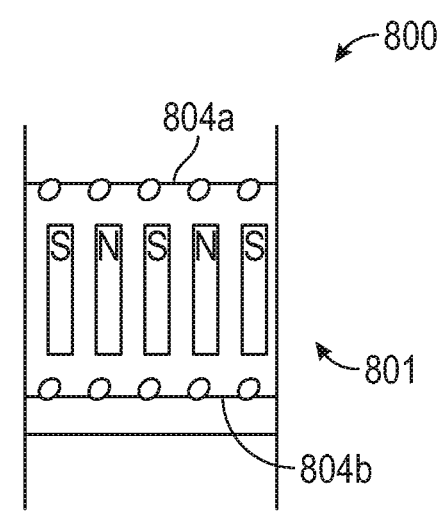
FIG. 8 shows a lateral view of a tool in accordance with embodiments of the present disclosure.

FIG. 8 shows a lateral view of a tool in accordance with embodiments of the present disclosure. The tool 800 includes a magnet assembly 801, including a plurality of equally spaced permanent bar magnets 802, an upper receiver 804a, and a lower receiver 804b. Receivers 804a and 804b comprise multi-turn coils wound on each magnet. The coils may be wound with an alternating winding direction. In other embodiments additional receivers may be mounted above and/or below the magnet array. Alternative sensors may also be used, including solid state sensors. The coils or other sensors may configured so that the signals from each coil or sensor is individually measured.

Many variations in magnetic transmitter and receiver configurations may be successfully employed. Transmitter and receiver assemblies may vary in number and location (e.g., with respect to the tool, to one another, to the drill bit, and so on), and magnets, coils, or sensors within may vary in orientation and radial location. Some embodiments may include bucking coils or other bucking components. Various sensor arrays of differing types may be placed on the BHA, a number of subs on the drill string, or various combinations of these. As one example, the techniques of the present disclosure are amenable for use with the 3DEX® tool, such as, for example, in connection with anisotropic formation media, or the Rt eXplorer (RTeX) tool, both provided by BAKER HUGHES INCORPORATED.

As non-limiting examples, each receiver of the logging tools herein may be configured as a loop antenna, a coil antenna, a monopole antenna, a dipole antenna, an antenna array, a patch antenna, a reflector antenna, a log-periodic antenna, a ring electrode, directional electrode arrays, and so on, including combinations of the above. Each receiver may be configured to operate at a plurality of frequencies. Each receiver may be configured to have a limited frequency range and tuned to discrete frequencies.

Figure 9:
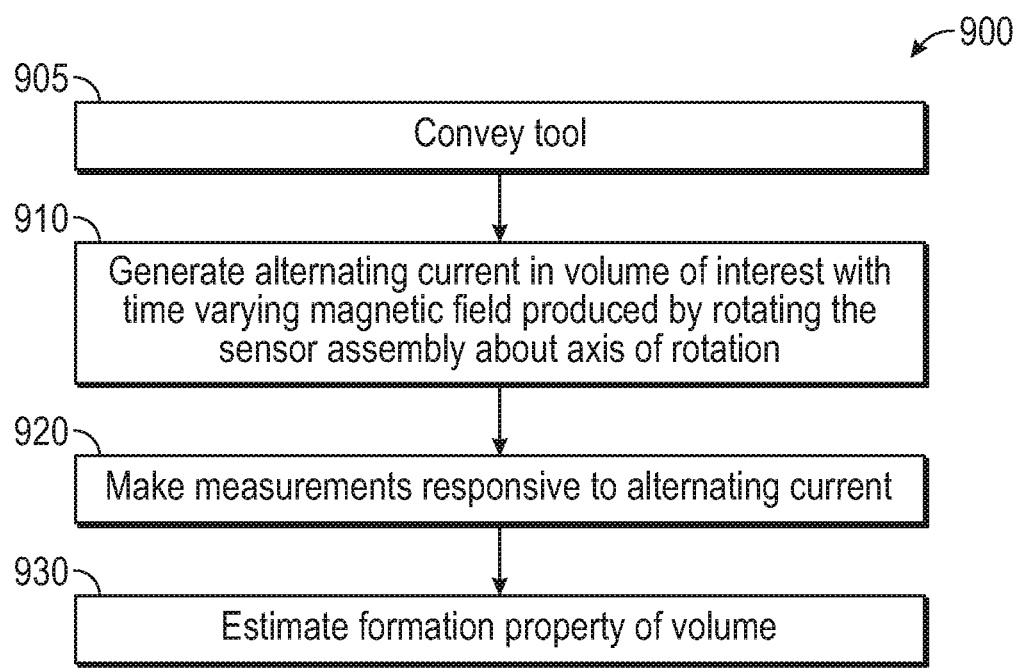
FIG. 9 illustrates methods for evaluating a volume of interest of an earth formation intersected by a borehole using electromagnetic (EM) signals in accordance with embodiments of the present disclosure.

FIG. 9 illustrates methods for evaluating a volume of interest of an earth formation intersected by a borehole using electromagnetic (EM) signals in accordance with embodiments of the present disclosure. Optional step 905 of method 900 comprises conveying a tool into a borehole intersecting the formation. The tool may be a component of a tool string. In some examples the tool may be a component of a drillstring, and conveyance of the drillstring may be carried out by advancing the drillstring and extending the borehole via rotation of a drill bit. The tool may be a tool as described above, and may have disposed thereon a sensor assembly comprising: i) at least one permanent magnet mounted at a first radial distance from an axis of rotation of the sensor assembly, and ii) at least one receiver sensor mounted at least one other radial distance from the axis.

Optional step 910 comprises generating an alternating current in a volume of interest of the formation surrounding the borehole with a time varying magnetic field in the volume produced by rotating the sensor assembly about the axis of rotation. The EM tool may include several connected or unconnected subs. Step 920 comprises making measurements at the at least one receiver sensor responsive to the alternating current, the measurements comprising at least one of: i) EM signals, and ii) magnetic fields. Step 920 may include making measurements using a tool on a tool string in the borehole by receiving a signal at least one receiver assembly responsive to the excitation. This may include making measurements of electrical signals caused by a secondary time-varying magnetic field generated by the alternating current.

Steps 910 and 920 may be carried out by using at least one processor to control receivers as well as to direct or control motors configured to rotate the magnet assembly directly or by using commands to intermediate processors (e.g., controllers, DSPs, and the like) in operative connection with measurement circuitry including signal generators, amplifiers, power sources, data storage, etc. to generate and measure electromagnetic phenomena (e.g., currents, charges, fields, standing waves, or propagating waves, etc). Steps 910 and 920 may include rotating the plurality of receiver sensors synchronously with the plurality of permanent magnets while generating the alternating current, and making the measurements of the formation property while rotating.

Step 930 comprises estimating at least one formation property of the volume using the measurements. The formation property may be a resistivity property. The resistivity property may be selected from: (i) a resistivity of the formation, (ii) a conductivity of the formation, (iii) a dielectric constant of the formation, and (iv) a magnetic permeability constant of the formation. Step 930 may include estimating, for all the measurements, or at each of a plurality of borehole depths, a parameter of interest of the formation in which the tool is located. This may be carried out in substantially real time while on a single logging run while drilling. See, for example, U.S. Pat. No. 7,027,922 to Bespalov et al, commonly owned and herein incorporated by reference, relating to estimation of formation resistivity.

Other optional steps include conducting secondary recovery operations in dependence upon the estimated parameter of interest. Secondary recovery operations may include any or all of drilling operations, injection operations, production operations, and the like. For example, the method may include commencing, modifying, continuing, or halting one or more drilling or production operations in dependence upon a model of the formation characterizing particular volumes of interest as having particular values of estimated true resistivity.

Method embodiments may include conducting further operations in the earth formation in dependence upon formation properties, measurements, or upon models created using ones of these. Further operations may include at least one of: i) geosteering; ii) drilling additional boreholes in the formation; iii) performing additional measurements on the formation; iv) estimating additional parameters of the formation; v) installing equipment in the borehole; vi) evaluating the formation; vii) optimizing present or future development in the formation or in a similar formation; viii) optimizing present or future exploration in the formation or in a similar formation; ix) drilling the borehole; x) producing one or more hydrocarbons from the formation information; xi) guiding drilling to avoid an existing well; and xii) guiding drilling to intersect an existing well.

Figure 10:
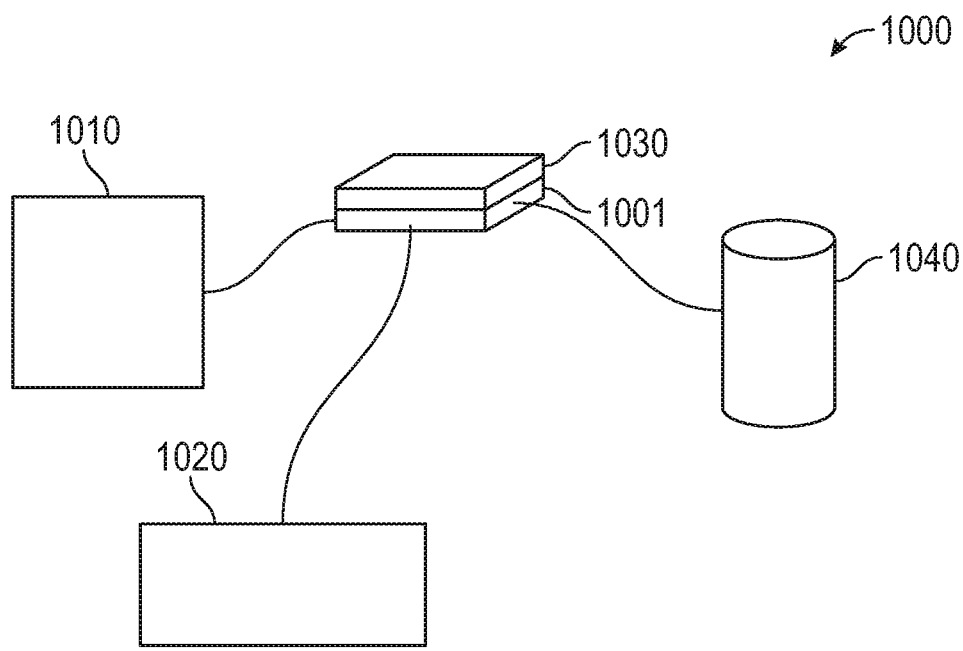
FIG. 10 shows an information processing system which may be implemented with a hardware environment in accordance with embodiments of the present disclosure.

FIG. 10 shows an information processing system 1000, which may be implemented with a hardware environment that includes a processor 1001, an information storage medium 1010, an input device 1020, processor memory 1030, and may include peripheral information storage medium 1040. The hardware environment may be in the well, at the rig, or at a remote location. Moreover, the several components of the hardware environment may be distributed among those locations. The input device 1020 may be any data reader or user input device, such as data card reader, keyboard, USB port, etc. The information storage medium 1010 stores information provided by the detectors. Information storage medium 1010 may include any non-transitory computer-readable medium for standard computer information storage, such as a USB drive, memory stick, hard disk, removable RAM, EPROMs, EAROMs, flash memories, optical disks, hard disks, or other commonly used memory storage system known to one of ordinary skill in the art including Internet or network based storage. Information storage medium 1010 stores a program that when executed causes information processor 1001 to execute the disclosed methods. Information storage medium 1010 may also store the formation information provided by the user, or the formation information may be stored in a peripheral information storage medium 1040, which may be any standard computer information storage device, such as a USB drive, memory stick, hard disk, removable RAM, or other commonly used memory storage system known to one of ordinary skill in the art including Internet or network based storage. Processor 1001 may be any form of processor or mathematical processing hardware, including Internet or network based hardware. When the program is loaded from information storage medium 1010 into processor memory 1030 (e.g. computer RAM), the program, when executed, causes information processor 1001 to retrieve sensor information from either information storage medium 1010 or peripheral information storage medium 1040 and process the information to estimate a parameter of interest. Processor 1001 may be located on the surface or downhole (e.g., downhole tool 100).

Implicit in the processing of the data is the use of logic implemented on a suitable medium, such as computer program instructions on non-transitory machine-readable medium (non-transitory computer-readable medium), that enables a processor to perform the control and processing. Aspects of the disclosure include using at least one processor to perform at least one of: i) storing the measurements in a computer memory; ii) transmitting the measurements uphole; iii) processing the measurements in the borehole; or iv) displaying of the measurements to an operating engineer.

In several non-limiting aspects of the disclosure, a processor includes a computer that executes programmed instructions for performing various methods. These instructions may provide for equipment operation, control, data collection and analysis and other functions in addition to the functions described in this disclosure. Thus, configuration of the processor may include operative connection with resident memory and peripherals for executing programmed instructions. The processor may execute instructions stored in computer memory accessible to the processor, or may alternatively employ logic implemented as field-programmable gate arrays ('FPGAs'), application-specific integrated circuits ('ASICs'), other combinatorial or sequential logic hardware, and so on.

Estimated parameters of interest may be stored (recorded) as information or visually depicted on a display (e.g., for an operating engineer). The parameters of interest may be transmitted before or after storage or display. For example, information may be transmitted to other downhole components or to the surface for storage, display, or further processing. Aspects of the present disclosure relate to modeling a volume of an earth formation using the estimated parameter of interest, such as, for example, by associating estimated parameter values with portions of the volume of interest to which they correspond, or by representing the boundary and the formation in a global coordinate system. The model of the earth formation generated and maintained in aspects of the disclosure may be implemented as a representation of the earth formation stored as information. The information (e.g., data) may also be transmitted, stored on a non-transitory machine-readable medium, and/or rendered (e.g., visually depicted) on a display.

Some embodiments may include receivers referred to as the Rx, Rz, and Ry receivers, aligned along the orthogonal system defined by three primary axes. The subscripts (x, y, z) indicate an orthogonal system substantially defined by the directions of the axes of the transmitters. In some implementations, the z-axis may be chosen to be along the longitudinal axis of the tool, while the x-axis and y-axis are mutually perpendicular directions lying in the plane transverse to the longitudinal axis.

In some embodiments, estimation of resistivity or control of operations may involve applying a model. The model may include, but is not limited to, (i) a mathematical equation, (ii) an algorithm, (iii) a database of associated parameters, or a combination thereof.

The non-transitory machine-readable medium may include ROMs, EPROMs, EAROMs, Flash Memories, Optical disks, and Hard disks. As noted above, the processing may be done downhole or at the surface, by using one or more processors. In addition, results of the processing, such as an image of a resistivity property or permittivity, can be stored on a suitable medium.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. Measurement information comprises information derived from an EM measurement, including a parameter of interest of the borehole, formation, or tool.

The term "conveyance device" or "carrier" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, and self-propelled tractors.

The term "predominantly" relates to an amount of current induced at an orientation of investigation in the earth formation relative to an amount of current induced in another orientation in the earth formation. A predominantly greater amount of current induced forward of the bit will provide a response of electromagnetic energy that can be related to a property of the earth formation ahead of the bit. As used herein, the term "predominantly" relates at least to a minimum amount of increase in currents induced in the direction of travel of the bit with respect to other directions, the minimum amount being necessary to be able to estimate a property of the earth formation ahead of the bit with reasonable certainty from the response.

The term "substantially real-time" as applied to methods of the present disclosure refers to an action performed while the BHA is still downhole and prior to the drill bit extending the borehole a distance of 1 meter, 0.5 meters, 0.25 meters, 0.1 meters, or less; and may be defined as estimation of true resistivity within 15 minutes of measurement, within 10 minutes of measurement, within 5 minutes of measurement, within 3 minutes of measurement, within 2 minutes of measurement, within 1 minute of measurement, or less. The term "geosteering" may refer to changing direction of the drill bit, stopping progression of the drill bit, or continuing advancement of the drill bit. "Borehole depth" refers to measured depth, or the depth that the distal end of the tool string has traveled along the borehole. Borehole depth will thus increase with extension of the borehole in a horizontal plane.

While the foregoing disclosure is directed to specific embodiments of the disclosure, various modifications will be apparent to those skilled in the art. It is intended that all variations be embraced by the foregoing disclosure.

What is claimed is:

1. An apparatus for evaluating a volume of interest of an earth formation using electromagnetic (EM) signals, the apparatus comprising:
a tool configured for conveyance in a borehole intersecting the formation, the tool having disposed thereon a sensor assembly comprising: i) a plurality of permanent magnets azimuthally distributed about an axis of rotation of the sensor assembly with each magnet of the plurality mounted at a first radial distance from the axis and having a respective azimuth and configured to rotate about the axis, and ii) a plurality of receiver sensors azimuthally distributed about the axis, with each receiver sensor mounted at at least one second radial distance from the axis and configured to be rotated about the axis, wherein the sensor assembly is configured to generate an alternating current in the volume of interest of the earth formation surrounding the borehole with a time varying magnetic field in the volume produced by rotating the sensor assembly about the axis of rotation;

at least one processor configured to:
make measurements at the at least one receiver sensor responsive to the alternating current, the measurements comprising at least one of: i) EM signals, and ii) magnetic fields; and
estimate at least a formation property of the volume using the measurements.

2. The apparatus of claim 1 wherein the tool comprises a drill collar at the end of a drillstring and having a drillbit at the distal end of the drill collar, the tool configured to disintegrate the formation at the drillbit to extend the borehole by rotating the drill collar.

3. The apparatus of claim 1 wherein the plurality of receiver sensors comprise induction receiver coils each wound around corresponding permanent magnets of the plurality of permanent magnets.

4. The apparatus of claim 1 wherein the plurality of receiver sensors comprise induction receiver coils each wound around a corresponding high magnetic permeability core.

5. The apparatus of claim 1 wherein the measurements comprise measurements of electrical signals caused by a secondary time-varying magnetic field generated by the alternating current.

6. The apparatus of claim 1 wherein the at least one receiver sensor comprises at least one of: i) at least one induction coil; ii) at least one toroid coil; iii) at least one magnetometer.

7. The apparatus of claim 1 wherein the plurality of permanent magnets is oriented in a radial pole alignment.

8. The apparatus of claim 1 wherein each magnet of the plurality of permanent magnets is diametrically opposed to another magnet of the plurality of permanent magnets.

9. A method of evaluating a volume of interest of an earth formation intersected by a borehole using electromagnetic (EM) signals, the method comprising:
conveying a tool in the borehole, the tool having disposed thereon a sensor assembly comprising: i) a plurality of permanent magnets azimuthally distributed about an axis of rotation of the sensor assembly with each magnet of the plurality mounted at a first radial distance from the axis and having a respective azimuth and configured to rotate about the axis, and ii) a plurality of receiver sensors azimuthally distributed about the axis, with each receiver sensor mounted at least one second radial distance from the axis and configured to be rotated about the axis;
generating an alternating current in a volume of interest of the formation surrounding the borehole with a time varying magnetic field in the volume produced by rotating the sensor assembly about the axis of rotation;
making measurements at the at least one receiver sensor responsive to the alternating current, the measurements comprising at least one of: i) EM signals, and ii) magnetic fields; and
estimating at least a formation property of the volume using the measurements.

10. The method of claim 9 wherein conveying the tool comprises extending the borehole by rotating a drill collar having a drillbit at the distal end of a drillstring to thereby disintegrate the formation at the drillbit.

11. The method of claim 9 wherein the sensor assembly comprises a plurality of permanent magnets, with each magnet of the plurality configured to rotate about the axis.

12. The method of claim 9 wherein the plurality of receiver sensors comprise induction receiver coils each wound around a corresponding high magnetic permeability core.

13. The method of claim 9 wherein the measurements comprise measurements of electrical signals caused by a secondary time-varying magnetic field generated by the alternating current.

14. The method of claim 9 wherein the plurlity of receiver sensors comprise induction receiver coils each wound around corresponding permanent magents of the plurality of permanent magnets.

15. An apparatus for evaluating a volume of interest of an earth formation using electromagnetic (EM) signals, the apparatus comprising:
a tool configured for conveyance in a borehole intersecting the formation, the tool having disposed thereon a sensor assembly comprising: i) a plurality of permanent magnets with each magnet of the plurality mounted at a radial distance from an axis of rotation of the sensor assembly and configured to rotate about the axis and ii) at least one receiver sensor comprising a plurality of induction receiver coils with at least one induction receiver coil of the plurality wound around a corresponding permanent magnet of the plurality of permanent magnets, wherein the sensor assembly is configured to generate an alternating current in the volume of interest of the earth formation surrounding the borehole with a time varying magnetic field in the volume produced by rotating the sensor assembly about the axis of rotation;
at least one processor configured to:
make measurements at the at least one receiver sensor responsive to the alternating current, the measurements comprising at least one of: i) EM signals, and ii) magnetic fields; and
estimate at least a formation property of the volume using the measurements.

* * * * *